United States Patent
Kobayashi et al.

(10) Patent No.: US 7,701,533 B2
(45) Date of Patent: Apr. 20, 2010

(54) ELECTRO-OPTICAL DEVICE AND ELECTRONIC APPARATUS

(75) Inventors: Kazu Kobayashi, Shiojiri (JP); Chihiro Tanaka, Matsumoto (JP); Masahiro Horiguchi, Tottori (JP); Toshinori Uehara, Matsumoto (JP); Hideki Kaneko, Tottori (JP); Shinichiro Tanaka, Tottori (JP)

(73) Assignee: Epson Imaging Devices Corporation (JP)

( * ) Notice: Subject to any disclaimer, the term of this patent is extended or adjusted under 35 U.S.C. 154(b) by 147 days.

(21) Appl. No.: 11/456,125

(22) Filed: Jul. 7, 2006

(65) Prior Publication Data

US 2007/0008461 A1    Jan. 11, 2007

(30) Foreign Application Priority Data

| Jul. 7, 2005 | (JP) | ............................. 2005-198384 |
| Mar. 29, 2006 | (JP) | ............................. 2006-090366 |

(51) Int. Cl.
    *G02F 1/1335*    (2006.01)
(52) U.S. Cl. ........................................ 349/106; 349/96
(58) Field of Classification Search .................. 349/106, 349/108; 345/614; 382/300
    See application file for complete search history.

(56) References Cited

U.S. PATENT DOCUMENTS

| 4,946,259 | A | * | 8/1990 | Matino et al. ................ 349/111 |
| 5,317,437 | A | * | 5/1994 | Katakura ...................... 349/144 |
| 5,341,153 | A | * | 8/1994 | Benzschawel et al. ....... 345/694 |
| 5,587,819 | A | * | 12/1996 | Sunohara et al. ............. 349/106 |
| 5,642,176 | A | * | 6/1997 | Abukawa et al. ............. 349/106 |
| 5,792,579 | A | * | 8/1998 | Phillips ........................... 430/7 |
| 5,793,446 | A | * | 8/1998 | Nose et al. ................... 348/751 |
| 5,841,494 | A | * | 11/1998 | Hall ............................... 349/98 |
| 6,077,634 | A | * | 6/2000 | Phillips ........................... 430/7 |
| 6,084,650 | A | * | 7/2000 | Sekiguchi .................... 349/106 |
| 6,104,446 | A | * | 8/2000 | Blankenbecler et al. ........ 349/5 |
| 6,120,947 | A | * | 9/2000 | Phillips ........................... 430/7 |
| 6,132,909 | A | * | 10/2000 | Phillips ........................... 430/7 |
| 6,147,728 | A | * | 11/2000 | Okumura et al. ............. 349/106 |
| 6,147,730 | A | * | 11/2000 | Budd et al. .................. 349/106 |
| 6,195,140 | B1 | * | 2/2001 | Kubo et al. .................... 349/44 |
| 6,215,538 | B1 |   | 4/2001 | Narutaki et al. |
| 6,242,141 | B1 | * | 6/2001 | Phillips ........................... 430/7 |
| 6,252,218 | B1 | * | 6/2001 | Chou ....................... 250/208.1 |
| 6,259,499 | B1 | * | 7/2001 | Yamanashi .................. 349/113 |
| 6,361,905 | B2 | * | 3/2002 | Phillips ........................... 430/7 |
| 6,376,133 | B1 | * | 4/2002 | Phillips ........................... 430/7 |
| 6,476,888 | B2 | * | 11/2002 | Yamanashi .................. 349/106 |

(Continued)

FOREIGN PATENT DOCUMENTS

CN    1492263 A    4/2004

(Continued)

*Primary Examiner*—Frank G Font
*Assistant Examiner*—Peter Radkowski
(74) *Attorney, Agent, or Firm*—Harness, Dickey & Pierce, P.L.C.

(57) ABSTRACT

An electro-optical device includes: a plurality of display pixels each of which has two Red sub-pixels, two Green sub-pixels, one Blue sub-pixel, and one transparent sub-pixel; and a colored layer which is partially formed on the Red, Green, and Blue sub-pixels. In the electro-optical device, uncolored portions are formed in parts of the Red and Green sub-pixels where the colored layer is not formed.

15 Claims, 10 Drawing Sheets

EXAMPLE OF ARRANGEMENT STRUCTURE OF DISPLAY PIXEL

U.S. PATENT DOCUMENTS

| | | | | |
|---|---|---|---|---|
| 6,573,960 B2* | 6/2003 | Kobayashi et al. | | 349/113 |
| 6,573,961 B2* | 6/2003 | Jiang et al. | | 349/115 |
| 6,614,498 B1* | 9/2003 | Tanaka et al. | | 349/143 |
| 6,624,860 B1 | 9/2003 | Narutaki et al. | | |
| 6,636,286 B1* | 10/2003 | Baek | | 349/114 |
| 6,714,206 B1* | 3/2004 | Martin et al. | | 345/589 |
| 6,806,929 B2* | 10/2004 | Chen et al. | | 349/114 |
| 6,831,720 B2* | 12/2004 | Jiang et al. | | 349/115 |
| 6,850,294 B2* | 2/2005 | Roh et al. | | 349/106 |
| 6,906,765 B2 | 7/2005 | Narutaki et al. | | |
| 6,914,649 B2* | 7/2005 | Liu | | 349/109 |
| 6,950,156 B1* | 9/2005 | Yoshida | | 349/106 |
| 6,954,241 B2* | 10/2005 | Takizawa et al. | | 349/106 |
| 7,015,506 B2 | 3/2006 | Tokuda et al. | | |
| 7,030,553 B2* | 4/2006 | Winters et al. | | 313/504 |
| 7,084,942 B2* | 8/2006 | Luo | | 349/114 |
| 7,158,197 B2* | 1/2007 | Okumura et al. | | 349/106 |
| 7,184,066 B2* | 2/2007 | Elliot et al. | | 345/694 |
| 7,205,713 B2* | 4/2007 | Kiguchi | | 313/504 |
| 7,209,197 B2* | 4/2007 | Okumura et al. | | 349/106 |
| 7,209,198 B2* | 4/2007 | Park et al. | | 349/106 |
| 7,212,262 B2* | 5/2007 | Kang | | 349/106 |
| 7,221,381 B2* | 5/2007 | Brown Elliott et al. | | 345/690 |
| 7,221,419 B2* | 5/2007 | Iijima | | 349/114 |
| 7,248,268 B2* | 7/2007 | Brown Elliott et al. | | 345/613 |
| 7,248,314 B2* | 7/2007 | Yun | | 349/108 |
| 7,250,998 B2 | 7/2007 | Narutaki et al. | | |
| 7,250,999 B2* | 7/2007 | Iijima | | 349/114 |
| 7,259,812 B2* | 8/2007 | Park et al. | | 349/106 |
| 7,268,757 B2* | 9/2007 | Ben-David et al. | | 345/88 |
| 7,277,145 B2* | 10/2007 | Luo | | 349/114 |
| 7,283,142 B2* | 10/2007 | Credelle et al. | | 345/694 |
| 7,286,194 B2* | 10/2007 | Okumura et al. | | 349/64 |
| 7,304,701 B2* | 12/2007 | Okumura et al. | | 349/106 |
| 7,317,502 B2* | 1/2008 | Hu et al. | | 349/114 |
| 7,349,047 B2* | 3/2008 | Iijima | | 349/114 |
| 7,372,525 B2* | 5/2008 | Liu | | 349/106 |
| 2002/0015110 A1* | 2/2002 | Brown Elliott | | 348/589 |
| 2002/0113921 A1* | 8/2002 | Jiang et al. | | 349/96 |
| 2003/0128310 A1* | 7/2003 | Takizawa et al. | | 349/106 |
| 2004/0051724 A1* | 3/2004 | Elliott et al. | | 345/694 |
| 2004/0095531 A1* | 5/2004 | Jiang et al. | | 349/115 |
| 2004/0109113 A1* | 6/2004 | Nakano et al. | | 349/114 |
| 2004/0135937 A1* | 7/2004 | Lee et al. | | 349/106 |
| 2005/0040756 A1* | 2/2005 | Winters et al. | | 313/504 |
| 2005/0140907 A1* | 6/2005 | Yun | | 349/144 |
| 2005/0168423 A1* | 8/2005 | Hirata et al. | | 345/88 |
| 2005/0168668 A1* | 8/2005 | Yoshida | | 349/65 |
| 2005/0248714 A1* | 11/2005 | Asao | | 349/179 |
| 2006/0038943 A1* | 2/2006 | Luo | | 349/114 |
| 2006/0038953 A1* | 2/2006 | Moriya | | 349/144 |
| 2006/0050210 A1* | 3/2006 | Tsuchiya | | 349/114 |
| 2006/0055713 A1* | 3/2006 | Asao et al. | | 345/690 |
| 2006/0132677 A1* | 6/2006 | Asao | | 349/106 |
| 2006/0139527 A1* | 6/2006 | Chang et al. | | 349/114 |
| 2006/0158586 A1* | 7/2006 | Bruinink et al. | | 349/114 |
| 2006/0158588 A1* | 7/2006 | Uh et al. | | 349/114 |
| 2006/0164576 A1* | 7/2006 | Aoki | | 349/114 |
| 2006/0197896 A1* | 9/2006 | Nakano et al. | | 349/114 |
| 2007/0008466 A1* | 1/2007 | Horiguchi | | 349/113 |
| 2007/0052887 A1* | 3/2007 | Brown Elliot et al. | | 349/108 |
| 2007/0109468 A1* | 5/2007 | Oku | | 349/110 |
| 2007/0121039 A1* | 5/2007 | Tago et al. | | 349/114 |
| 2007/0139587 A1* | 6/2007 | Chen et al. | | 349/106 |
| 2007/0164953 A1* | 7/2007 | Huang et al. | | 345/88 |
| 2007/0165161 A1* | 7/2007 | Kao et al. | | 349/114 |
| 2007/0182892 A1* | 8/2007 | Higa et al. | | 349/114 |
| 2007/0229748 A1* | 10/2007 | Fujita | | 349/141 |
| 2007/0242014 A1* | 10/2007 | Lee et al. | | 345/88 |
| 2007/0247570 A1 | 10/2007 | Narutaki et al. | | |
| 2008/0002085 A1 | 1/2008 | Narutaki et al. | | |

FOREIGN PATENT DOCUMENTS

| | | |
|---|---|---|
| JP | 11-183891 | 7/1999 |
| JP | 2000-111902 | 4/2000 |
| JP | 2000-162644 | 6/2000 |
| JP | 2004-004822 | 1/2004 |
| JP | 2004-078218 | 3/2004 |
| JP | 2004-252426 | 9/2004 |

* cited by examiner

FIG. 6
EXAMPLE OF ARRANGEMENT
STRUCTURE OF DISPLAY PIXEL

FIG. 7

FIG. 8
EXAMPLE OF GENERAL RGB PIXEL ARRANGEMENT STRUCTURE

ELECTRO-OPTICAL DEVICE AND ELECTRONIC APPARATUS

BACKGROUND

1. Technical Field

The present invention relates to a liquid crystal display device suitable for display of various information.

2. Related Art

Nowadays, liquid crystal display devices are used in portable apparatuses such as cellular phones and personal digital assistances. A liquid crystal display is composed of pixels having sub-pixels that have red, green, and blue (hereinafter, referred to as R, G, and B) color filters. Recently, liquid crystal display devices using transparent (hereinafter, referred to as W) sub-pixels in addition to R, G, and B sub-pixels have been proposed (for example, see JP-A-2004-4822).

In a liquid crystal display device disclosed in JP-A-2004-4822, one display pixel is composed of six sub-pixels, that is, two R sub-pixels, two G sub-pixels, one B sub-pixel, and one W sub-pixel. In other words, the proportion of the area of the B sub-pixel in one display pixel is half that of the area of the R and G sub-pixels. Therefore, in white display, yellowish white is displayed due to the small amount of blue light.

SUMMARY

An advantage of some aspects of the invention is that it provides an electro-optical device having transparent W sub-pixels in which a white balance can be adjusted.

According to a first aspect of the invention, an electro-optical device includes: a plurality of display pixels each of which has two R sub-pixels, two G sub-pixels, one B sub-pixel, and one W sub-pixel; and a colored layer which is partially formed on the R, G, and B sub-pixels. In the electro-optical device, uncolored portions are formed in parts of the R and G sub-pixels where the colored layer is not formed.

The electro-optical device is, for example, a liquid crystal display device, and each display pixel is composed of two R sub-pixels, two G sub-pixels, one B sub-pixel, and one W sub-pixel. Here, the W color is basically transparency, but may have a reddish, bluish, or yellowish tinge. In particular, the W color represents a color within a range expressed by (X, Y)=(0.3 to 0.4, 0.3 to 0.4) in the CIE (International Commission on Illumination) chromaticity diagram. The colored layer is formed in a display region of each of the R, G, B, and W sub-pixels. Therefore, the area proportion of the B sub-pixel of the display pixel is half the R or G sub-pixel of the display pixel and thus the amount of a B light component is less than the amount of an R or G light component. The uncolored layer where the colored layer does not exist is formed in the display region of each of the R and G sub-pixels. In this way, the amount of the R or G light component can be reduced for adjustment. As a result, it is possible to adjust the white balance in white display to a predetermined color temperature state so as to restrict coloring in the white display.

It is preferable that, in the electro-optical device according to the first aspect, the total area of the B sub-pixel and the W sub-pixel be substantially equal to the area of the two R sub-pixels and be substantially equal to the area of the two G sub-pixels. In this construction, the total area of one color sub-pixel of the R, G, and B sub-pixels and the W sub-pixel is substantially equal to the area of the two other sub-pixels.

It is preferable that, in the electro-optical device according to the first aspect, each of the R, G, and B sub-pixels have a transmissive region and a reflective region, and the uncolored portion be formed in the transmissive region of each of the R and G sub-pixels. With this construction, the white balance of white display in transmissive display can be adjusted to a predetermined color temperature state.

It is preferable that, in the electro-optical device according to the first aspect, the area of the uncolored portion of the transmissive region of each of the G sub-pixels be larger than the area of the uncolored portion of the transmissive region of each of the R sub-pixels. With this construction, it is possible to more properly adjust the white balance in any case including intermediate grayscale display.

It is preferable that, in the electro-optical device according to the first aspect, each of the R, G, and B sub-pixels have a transmissive region and a reflective region, and the uncolored portion is formed in the reflective region of each of the R and G sub-pixels. With this construction, the white balance of white display in reflective display can be adjusted to a predetermined color temperature state.

It is preferable that, in the electro-optical device according to the first aspect, the area of the uncolored portion of the reflective region of each of the G sub-pixels be larger than the area of the uncolored portion of the reflective region of each of the R sub-pixels. Therefore, the white balance can be more properly adjusted in any case including intermediate grayscale display.

It is preferable that, in the electro-optical device according to the first aspect, the chromaticity of white displayed by using the R, G, B, and W sub-pixels is in a coordinate range expressed by (X, Y)=(0.3 to 0.4, 0.3 to 0.4) in a CIE (International Commission on Illumination) chromaticity diagram. Therefore, the electro-optical device according to the first aspect of the invention can perfectly perform white display.

It is preferable that, in the electro-optical device according to the first aspect, the uncolored portion of each of the R sub-pixels have an area larger than 10% of the area of the R sub-pixel.

It is preferable that, in the electro-optical device according to the first aspect, the uncolored portion of each of the G sub-pixels have an area larger than 30% of the area of the G sub-pixel.

It is preferable that, in the electro-optical device according to the first aspect, each of the R, G, and B sub-pixels of one of the plurality of display pixels perform display by superimposing a gray-scale signal which is applied for display of the sub-pixels in one display pixel to sub-pixels having the same color with the one display pixel around the one display pixel.

According to a second aspect of the invention, an electro-optical device includes: a plurality of display pixels each of which has at least a W sub-pixel and one color sub-pixel; and a colored layer which is formed on the one color sub-pixel. In the electro-optical device, an uncolored portion is provided in a part of the one color sub-pixel where the colored layer is not formed.

According to the second aspect of the invention, an electro-optical device includes the plurality of display pixels each of which has the W sub-pixel and one color sub-pixel. In this electro-optical device, the one color sub-pixel has the colored layer and the uncolored portion where the colored layer does not exist. Therefore, the white balance in white display can be adjusted to a predetermined color temperature state and coloring in the white display can be restricted.

According to a third aspect of the invention, an electronic apparatus includes the electro-optical device according to the first or second aspect as a display unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments according to the present invention will be described with reference to the accompanying drawings. In the following various embodiments, the invention is applied to a liquid crystal display device instanced as an electro-optical device.

Construction of Liquid Crystal Display Device

In the present embodiment, the invention is applied to an active matrix drive type liquid crystal display device using a-Si TFT (thin film transistor) elements as an example of a three-terminal element.

First, the construction of a liquid crystal display device 100 according to the present embodiment will be described with reference to FIGS. 1 to 5.

Figure 1:
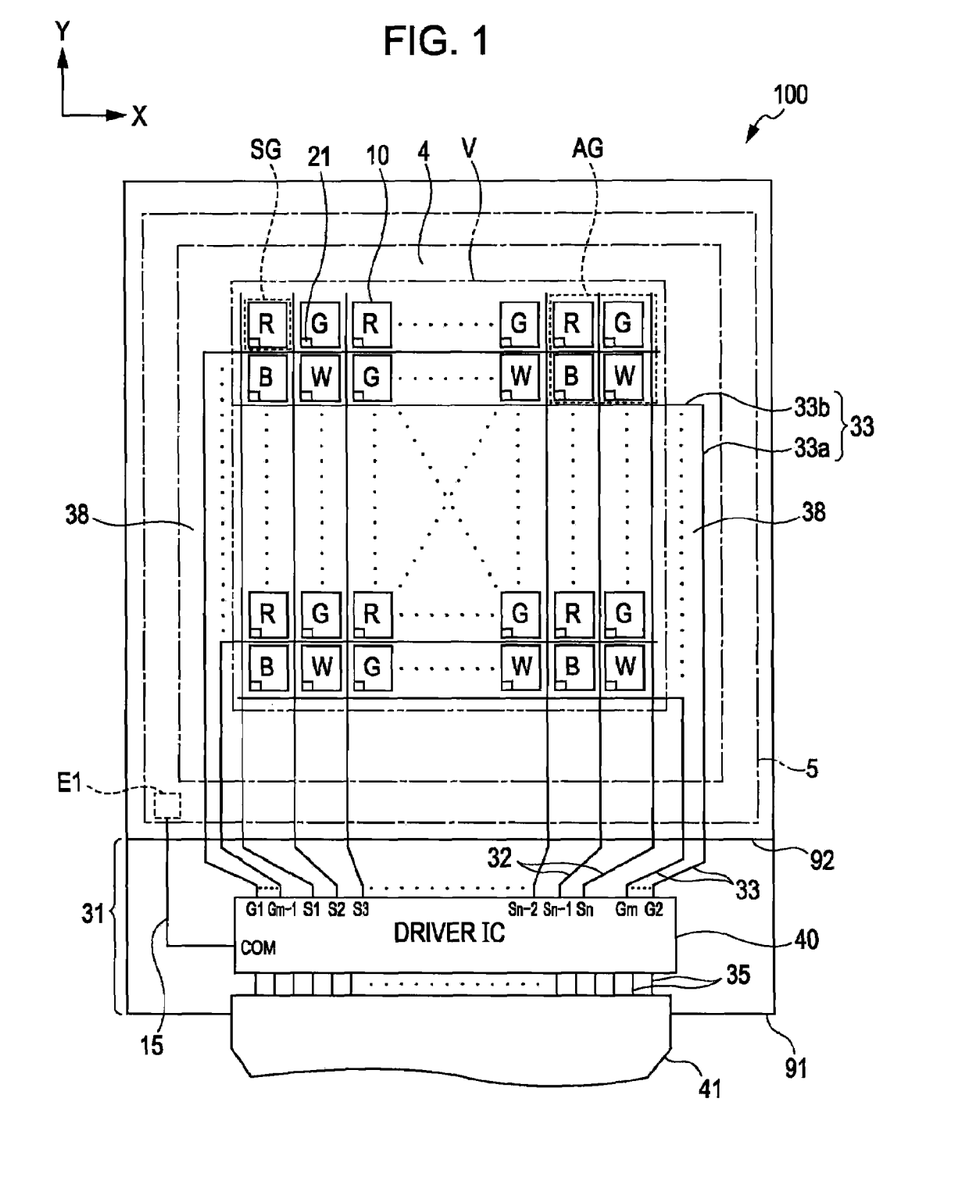
FIG. 1 is a plan view schematically showing the construction of a liquid crystal device according to an embodiment.

FIG. 1 is a plan view schematically showing the construction of the liquid crystal display device 100 according to the present embodiment. In FIG. 1, a color filter substrate 92 and an element substrate 91 are disposed on the front side (observation side) and the rear side of the plane of the figure, respectively. In addition, in FIG. 1, a longitudinal direction (column direction) and a lateral direction (row direction) of the figure are defined as a Y direction and an X direction, respectively. Further, in FIG. 1, individual regions corresponding to R (red), G (green), B (blue), or W (transparent) represent one sub-pixel SG. Two rows by two columns of sub-pixels SG corresponding to R, G, B, and W represent one pixel region AG (display pixel AG).

In the invention, a pixel region AG is formed of R, G, B, and W sub-pixels, unlike the related art in which a pixel region is formed of R, G, and B sub-pixels. Therefore, in the invention, display is performed by using a rendering technique different from that of the related art. The rendering technique uses an image processing technique of superimposing gray-scale signals applied to sub-pixels SG having R, G, and B color layers in one arbitrary pixel region AG to sub-pixels SG of the same colors around the pixel region AG as well as the sub-pixels SG in the pixel region AG. In other words, each of R, G, and B sub-pixels SG in one pixel region AG (display pixel) is enabled to perform display by superimposing gray-scale signals contributing to display of the sub-pixels SG in one display pixel AG even to sub-pixels SG of the same color in display pixels around the one display pixel AG.

Therefore, an image can be viewed in a resolution higher than the resolution corresponding to the real number of pixels. For example, in a case of using a liquid crystal device having a screen display resolution corresponding to a QVGA (Quarter Video Graphics Array) standard, it is possible to realize a screen display resolution corresponding to a VGA (Video Graphics Array) standard.

In the liquid crystal display device 100, the element substrate 91 is bonded to the color filter substrate 92 disposed to be opposite to the element substrate 91 by a frame-shape sealant 5, and liquid crystal is enclosed within the sealant 5 so as to form a liquid crystal layer 4.

Here, the liquid crystal display device 100 may be a liquid crystal display device which uses R, G, B, and W colors for color display and an active matrix driving type liquid crystal device which uses a-Si TFT elements as switching elements. Further, the liquid crystal display device 100 may be a transflective liquid crystal display device where each of R, G, and B sub-pixels SG has a transmissive region and a reflective region and a liquid crystal display device which has a multi-gap structure in which the thickness of the liquid crystal layer 4 is different in the transmissive region and the reflective region.

First, the planar construction of the element substrate 91 will be described. On the inner surface of the element substrate 91, there are formed or mounted a plurality of source lines 32, a plurality of gate lines 33, a plurality of a-Si TFT elements 21, a plurality of pixel electrodes 10, a driver IC 40, a plurality of external connection wiring lines 35, an FPC (Flexible Printed Circuit) 41, etc.

As shown in FIG. 1, the element substrate 91 has a projecting region 31 extending outward from one side of the color filter substrate 92. The driver IC 40 is mounted on the projecting region 31. Each of input terminals (not shown) of the driver IC 40 are electrically connected to one end of a corresponding one of the plurality of external connection wiring lines 35 and the other end of each of the plurality of external connection wiring lines 35 is electrically connected to the FPC 41. The source lines 32 are formed to extend in a Y direction at appropriate intervals along an X direction. One end of each of the source lines is electrically connected to a corresponding one of output terminals (not shown) of the driver IC 40.

Each gate line 33 has a first wiring line 33a formed to extend in the Y direction and a second wiring line 33b formed to extend in the X direction from an end of the first wiring line 33a. The second wiring lines 33b of the gate lines 33 are formed at appropriate intervals along the Y direction so as to extend in a direction intersecting each of the source lines 32, that is, the X direction. One end of each of the first wiring lines 33a of the gate lines 33 is electrically connected to a corresponding one of the output terminals (not shown) of the driver IC 40. A TFT element 21 is disposed at each of positions corresponding to the intersections between the source lines 32 and the second wiring lines 33b of the gate lines 33. Each TFT element 21 is electrically connected to one of the source lines 32, one of the gate lines 33, and one of the pixel electrodes 10 corresponding to the TFT element. One TFT element 21 and one pixel electrode 10 are disposed at a position corresponding to each sub-pixel SG. Each pixel electrode 10 is formed of a transparent conductive material, for example, ITO (Indium-Tin Oxide).

A plurality of pixel regions AG are arranged in the X direction and the Y direction so as to form an effective display region V (surrounded by a two-dot chain line) in a matrix. In the effective display region V, images such as letters, numerals, figures, and so on can be displayed. A region outside of the effective display region V is a frame region 38 which does not contribute to display. Further, an alignment film (not shown) is formed on inner surfaces of the source lines 32, the gate lines 33, the TFT elements 21, the pixel electrodes 10, etc.

Next, the planar construction of the color filter substrate 92 will be described. The color filter substrate 92 has a light shielding layer (generally called as 'a black matrix' and abbreviated to 'BM' hereinafter), R, G, and B colored layers 6R, 6G, and 6B, a common electrode 8, etc. Hereinafter, when it is unnecessary to distinguish the colors of the colored layers, the colored layers will be simply written to a 'colored layer 6', while, when it is necessary to distinguish the colors of the colored layers, the red, green, and blue colored layers will be referred to as a 'colored layer 6R', 'colored layer 6G', and 'colored layer 6B', respectively. The BM is formed at a position partitioning each of the sub-pixels SG. In FIG. 1, the colored layer is not provided for a sub-pixel SG corresponding to the sub-pixel W. The common electrode 8 is formed of a transparent conductive material such as ITO as the pixel electrodes cover almost one entire surface of the color filter substrate 92. The common electrode 8 is electrically connected to an end of a wiring line 15 in a corner region E1 of the sealant 5, and the other end of the wiring line 15 is electrically connected to an output terminal corresponding to a COM of the driver IC 40.

In the liquid crystal display device 100 having the above-mentioned construction, the driver IC 40 selects exclusively and sequentially the gate lines 33 in the order of G1, G2, . . . , Gm−1, Gm (where m is a natural number) one by one on the basis of electric power and signals from the FPC 41 connected to an electronic apparatus. The selected gate line 33 is supplied with a gate signal of a selection voltage and the other unselected gate lines 33 are supplied with non-selection gate signals. Then, the driver IC 40 supplies source signals according to display contents to the pixel electrode 10 positioned so as to correspond to the selected gate line 33 through the corresponding source lines 32 (S1, S2, . . . , Sn−1, Sn (where n is a natural number)) and the TFT 21. As a result, the display state of the liquid crystal layer 4 is changed to a non-display state or an intermediate display state such that the alignment state of the liquid crystal layer 4 is controlled.

Pixel Construction

Figure 2:
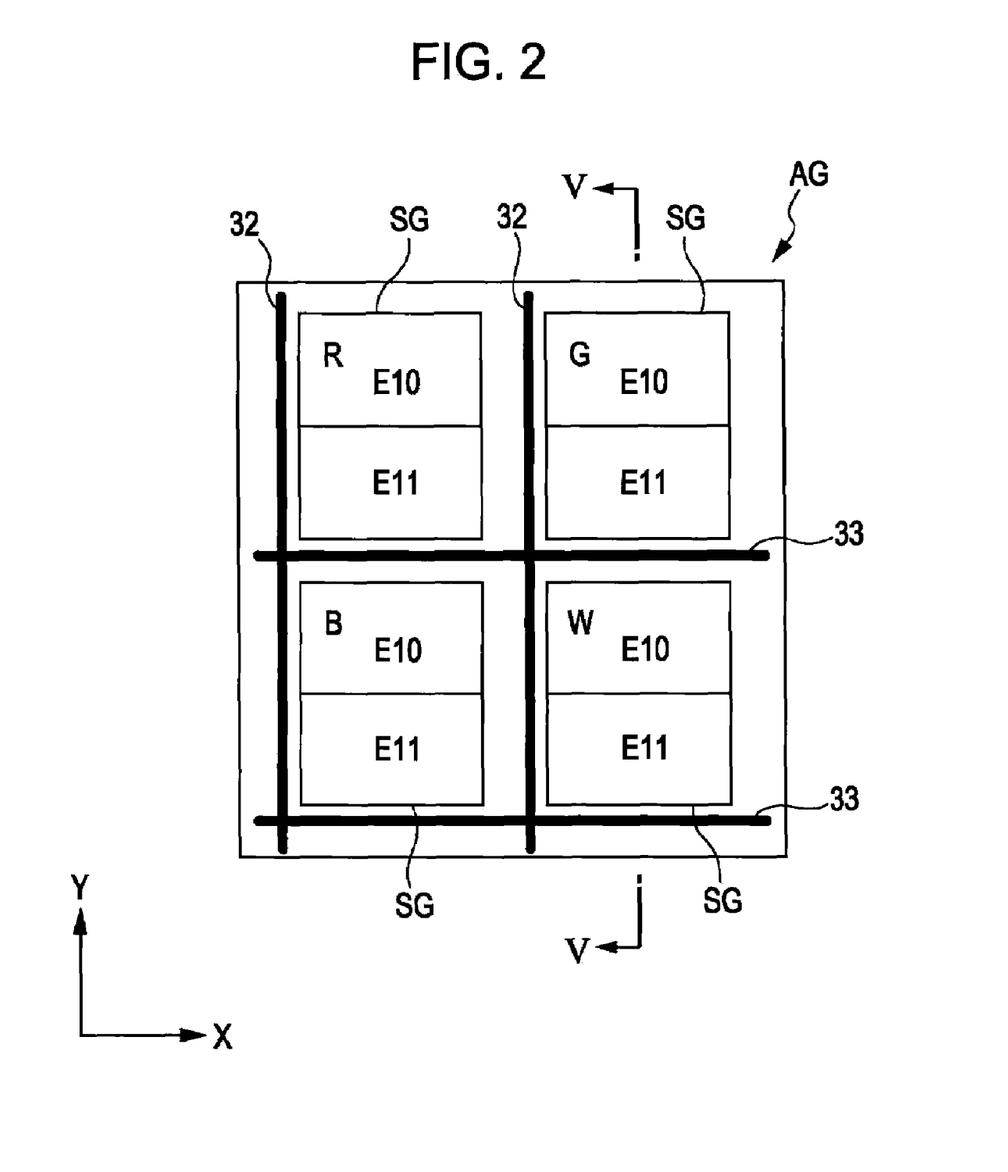
FIG. 2 is a plan view showing the construction of one pixel including R, G, B, and W sub-pixels according to the embodiment.

Next, the construction of one pixel region AG will be described with reference to FIG. 2 and so on. FIG. 2 is an enlarged plan view showing a part corresponding to one pixel region AG (surrounded by a broken line) of FIG. 1.

As shown in FIG. 2, one pixel region AG is composed of sub-pixels SG that correspond to R, G, B, and W and are arranged in a two-by-two matrix. The individual sub-pixels SG corresponding to R, G, B, and W have a transmissive region E10 for performing transmissive display and a reflective region for E11 for performing reflective display.

Next, referring to FIGS. 3A and 3B, the construction of the reflective region E11 and the construction of the transmissive region E10 in each of the sub-pixels SG corresponding to R, G, and B of FIG. 2 will be described.

Figure 3A:
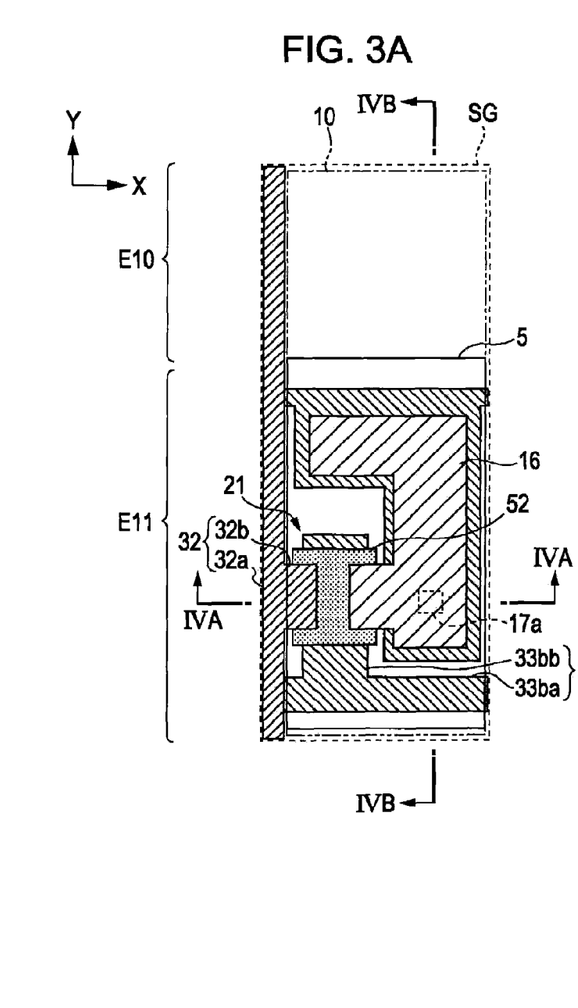
FIG. 3A is an enlarged plan view showing the construction of a part of an element substrate corresponding to each of the R, G, and B sub-pixels.
Figure 3B:
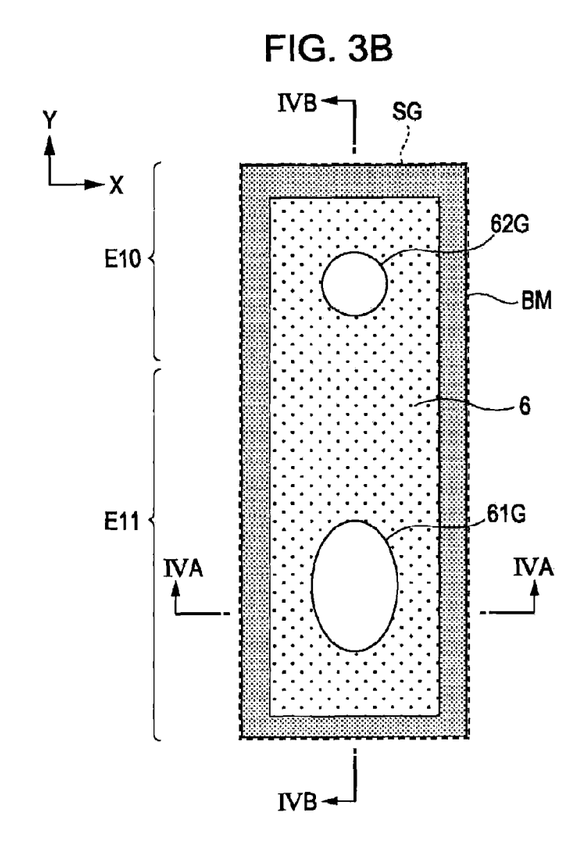
FIG. 3B is an enlarged plan view showing the construction of a part corresponding to each of the R, G, and B sub-pixels in a color filter substrate.
Figure 4A:
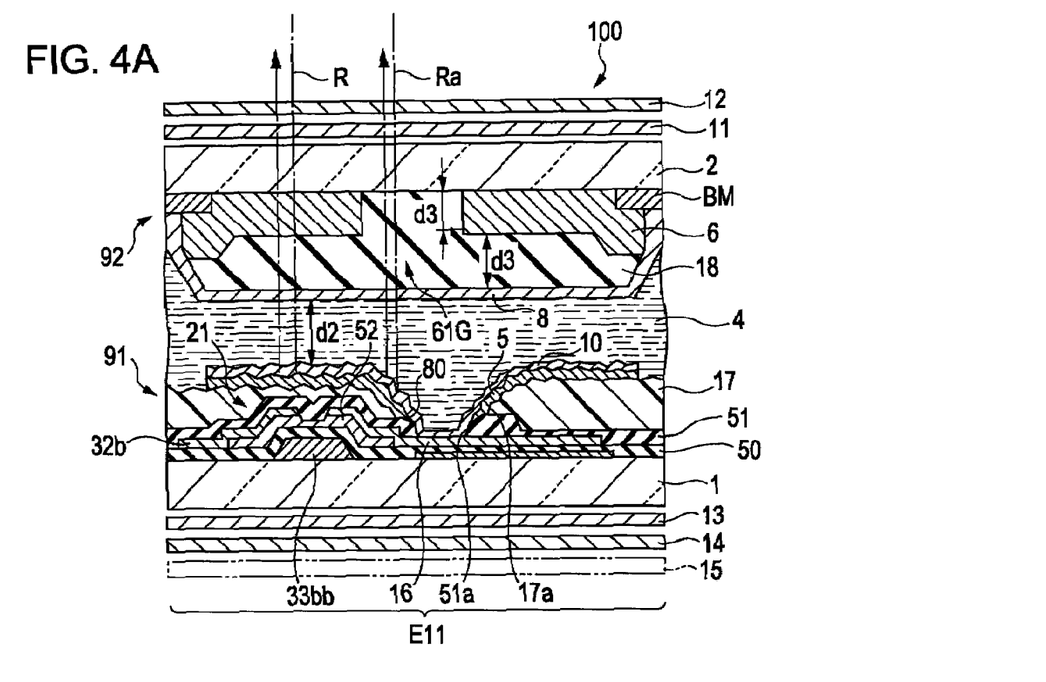
FIG. 4A is a partial sectional view taken along the line IVA-IVA of FIGS. 3A and 3B.
Figure 4B:
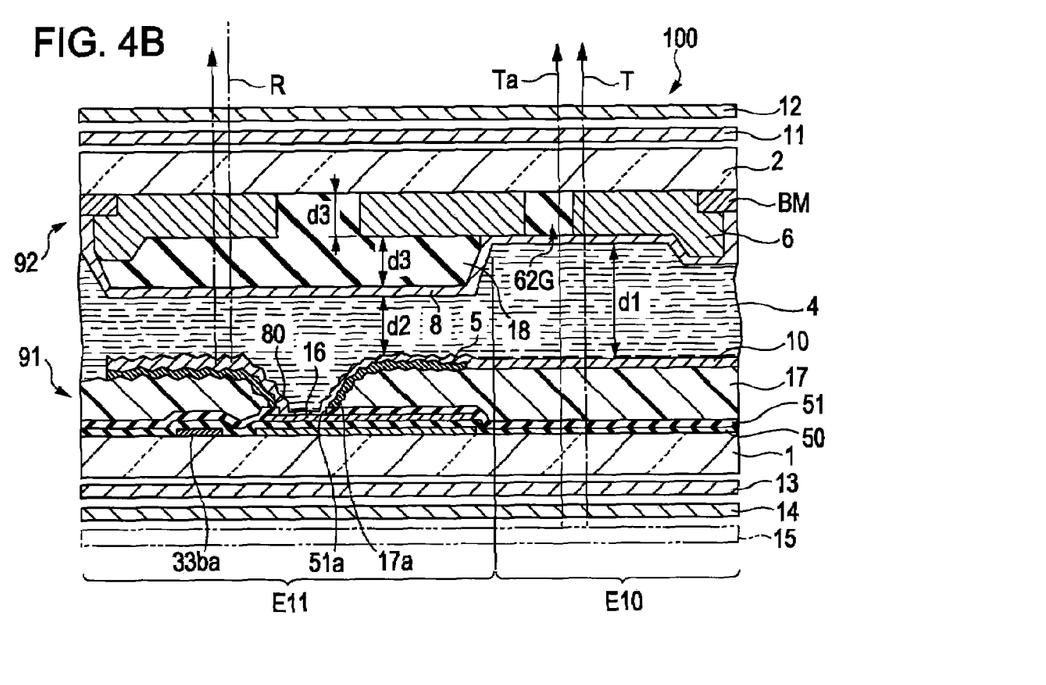
FIG. 4B is a partial sectional view taken along the line IVB-IVB of FIGS. 3A and 3B.

FIG. 3A is an enlarged plan view showing the construction of a part of the element substrate 91 corresponding to each of the R, G, and B sub-pixels SG. FIG. 3B is an enlarged plan view showing the construction of a part corresponding to each of the R, G, and B sub-pixels SG in the color filter substrate 92 that is opposite to the element substrate 91 of FIG. 3A. FIG. 4A is a local sectional view taken along the line IVA-IVA of FIGS. 3A and 3B, and shows the sectional construction of the liquid crystal display device 100 corresponding to the reflective region E11 of each of the R, G, and B sub-pixels. FIG. 4B is a local sectional view taken along the line IVB-IVB of FIGS. 3A and 3B, and shows the sectional construction of the liquid crystal display device 100 corresponding to each of the R, G, and B sub-pixels SG.

First, the construction of the reflective region E11 in one of the R, G, and B sub-pixels SG will be described.

The gate lines 33 are formed on a lower substrate 1 formed of glass, quartz, or the like. In FIG. 3A, each of the second wiring lines 33b of the gate lines 33 has a main line portion 33ba extending in the X direction and a branch line portion 33bb that is branched from the main line portion 33ba to orient in the Y direction. A gate insulating layer 50 having an insulation property is formed on the lower substrate 1 and the gate lines 33. An a-Si layer 52 is provided as a component of the TFT element 21 on the gate insulating layer 50 at a position where the gate insulating layer 50 overlaps the branch line portion 33bb of the gate line 33 in plan view. The source lines 32 are formed on the gate insulating layer 50 to extend in a direction intersecting with the gate lines 33.

Each gate line 32 has a main line portion 32a extending in the Y direction and a branch line portion 32b that is branched from the main line portion 32a to orient in the X direction as shown in FIG. 3A. A part of the branch line portion 32b of the gate line 32 is formed on a part on one end of the a-Si layer 52. Capacitance holding electrodes 16 are formed of a metal or the like on the gate insulating layer 50 and on a part of the other end of the a-Si layer 52. Thereby, the a-Si layer 52 is electrically connected to the source line 32 and the capacitance holding electrode 16. Further, the TFT element 21 including the a-Si layer 52 as an element is formed at a position corresponding to the a-Si layer 52.

A passivation layer 51 (reactivity protecting layer) having an insulation property is formed on the source lines 32, the capacitance holding electrodes 16, and the gate insulating layer 50. The passivation layer 51 has contact holes 51a (openings) at positions where the passivation layer 51 overlaps the capacitance holding electrodes 16 in plan view. A plurality of resin layers 17 is formed of a resin material or the like on the passivation layer 51. A plurality of fine concave and convex portions is formed on surfaces of the resin layers 17 so as to scatter light. The resin layer 17 has contact holes 17a at positions corresponding to the contact holes 51a of the passivation layer 51. Reflective electrodes 5 formed of Al (aluminum) or the like and having a reflective function are provided on the resin layers 17. Since the reflective electrodes 5 are formed on the resin layer 17 having the plurality of fine concave and convex portions, the reflective electrodes 5 have a shape in which the plurality of fine concave and convex portions is reflected. Transmissive opening regions 80 are formed at positions of the reflective electrodes 5 corresponding to the contact holes 51*a* and 17*a* so as to transmit light. Pixel electrodes 10 are formed on the reflective electrodes 5.

Further, a retardation film 13 (a quarter-wave plate) is disposed on the outer surface of the lower substrate 1 and a polarizing plate 14 is disposed on the outer surface of the retardation film 13. Further, a backlight 15 is disposed as an illuminating device on the outer surface of the polarizing plate 14. Preferably, the backlight 15 is formed by combining a light guiding plate with a point light source such as an LED (Light Emitting Diode) or a linear light source such as a cold cathode fluorescent tube.

Meanwhile, the construction of the color filter substrate 92 corresponding to the reflective region E11 of one of the R, G, and B sub-pixels SG is as follows.

An R, G, or B colored layer 6 is formed at a position corresponding to the reflective region E11 on the upper substrate 2 formed of the same material as the lower substrate 1. The thickness of the colored layer 6 is set to d3. The colored layer 6 has an uncolored portion 62G formed in the transmissive region E10 and an uncolored portion 61G formed in the reflective region E11. The BM is formed at a position partitioning adjacent colored layers 6. An insulating layer 18 for adjusting a cell thickness is formed of a resin material or the like on the colored layer 6. The insulating layer 18 functions to set the thicknesses (cell thickness) of the liquid crystal layer 4 corresponding to the transmissive region E10 and the reflective region E11 of each of the R, G, and B sub-pixels SG. In other words, the insulating layer 18 for adjusting a cell thickness has a multi-gap structure so as to uniformly set optical characteristics in both of the transmissive region E10 and the reflective region E11. The thickness of the insulating layer 18 for adjusting a cell thickness is set to the same value as the thickness d3 of each colored layer 6. A common electrode 8 is formed on the insulating layers 18 for adjusting a cell thickness and so on.

Further, a retardation film 11 (quarter-wave plate) is disposed on the outer surface of the upper substrate 2, and a polarizing plate 12 is disposed on the outer surface of the retardation film 11.

The above-mentioned element substrate 91 corresponding to the reflective region E11 is disposed opposite to the color filter substrate 92 corresponding to the reflective region E11 with the liquid crystal layer 4 interposed therebetween. The thickness of the liquid crystal layer 4 corresponding to the reflective region E11 is set to d2.

When display is performed in the reflective region E11 having the above-mentioned construction, light entering the liquid crystal display device 100 from the outside propagates along a path R shown in FIGS. 4A and 4B. In other words, the light entering the liquid crystal display device 100 is reflected by the reflective electrode 5 and reaches an observer. In this case, the light from the outside passes through a region where there is formed the R, G, and B colored layers 6, the common electrode 8, the pixel electrodes 10, etc., and is reflected by the reflective electrode 5 positioned on the lower side of the pixel electrodes 10. Then, the reflected light passes through the pixel electrodes 10, the common electrode 8, the color layers 6, etc. As a result, the light can express a predetermined color with a predetermined intensity such that the observer can see a desired color display image.

Light entering the uncolored portion 61G propagates along a path Ra shown in FIG. 4A and thus does not pass through the colored layer 6G. For this reason, the light entering the uncolored portion 61G cannot express the G (green) color. Therefore, when the proportion of the area of the uncolored portion 61G becomes large in the sub-pixel SG, the amount of light entering the uncolored portion 61G from the outside increases. As a result, in a case of performing reflective display, the amount of the G light component in a screen display decreases.

Next, the construction of the transmissive region E10 in the R, G, or B sub-pixel SG will be described.

The gate insulating layer 50 is formed on the lower substrate 1 as shown in FIG. 4B. The passivation layer 51 is formed on the gate insulating layer 50. The resin layer 17 is formed on the passivation layer 51. As described above, the resin layer 17 having the fine concave and convex regions on the surface thereof is formed in the reflective region E11 while the resin layer 17 having no fine concave and convex regions on the surface thereof is formed in the transmissive region E10. In other words, the surface of the resin layer 17 formed in the transmissive region E10 is almost flat. The pixel electrode 10 is formed on the resin layer 17. Further, the retardation film 13 is disposed on the outer surface of the lower substrate 1, and the polarizing plate 14 is disposed on the outer surface of the retardation film 13. Furthermore, the backlight 15 is disposed on the outer surface of the polarizing plate 14.

The construction of the color filter substrate 92 corresponding to the transmissive region E10 of the R, G, or B sub-pixel SG is as follows. The colored layer 6R, 6G, or 6B is formed on the upper substrate 2. The common electrode 8 is formed on the colored layer 6. Further, the retardation film 11 is disposed on the outer surface of the upper substrate 2, and the polarizing plate 12 is disposed on the outer surface of the retardation film 11.

The above-mentioned element substrate 91 corresponding to the transmissive region E10 is disposed opposite to the color filter substrate 92 corresponding to the transmissive region E10 with the liquid crystal layer 4 interposed therebetween. The thickness d1 of the liquid crystal layer 4 corresponding to the transmissive region E10 is set to be larger than the thickness d2 of the liquid crystal layer 4 corresponding to the reflective region E11, thereby forming the multi-gap structure.

When transmissive display is performed in the transmissive region E10 having the above-mentioned construction, illuminating light emitted from the backlight 15 propagates along a path T shown in FIG. 4B, passes through the gate insulating layer 50, the passivation layer 51, the pixel electrode 10, the colored layer 6, etc., and reaches the observer. In this case, the illuminating light expresses a predetermined color and a predetermined intensity by passing through the colored layer 6R, 6G, or 6B. As a result, the observer can see a desired color display image.

Illuminating light entering the uncolored portion 62G propagates along a path Ta shown in FIG. 4B, and thus does not pass through the colored layer 6G. For this reason, the illuminating light entering the uncolored portion 62G does not express G (green) color. Therefore, when the proportion of area of the uncolored portion 62G in the sub-pixel SG becomes large, the amount of illuminating light entering the uncolored portion 62G increases. As a result, in a case of performing reflective display, the amount of the G light component in a screen display decreases.

As described above, the amount of the G light component in the reflective display can be adjusted by adjusting the area of the uncolored portion 61G, and the amount of the G light component in the transmissive display can be adjusted by adjusting the area of the uncolored portion 62G.

Next, referring to FIG. 5, the construction of a W sub-pixel SG will be described.

Figure 5:
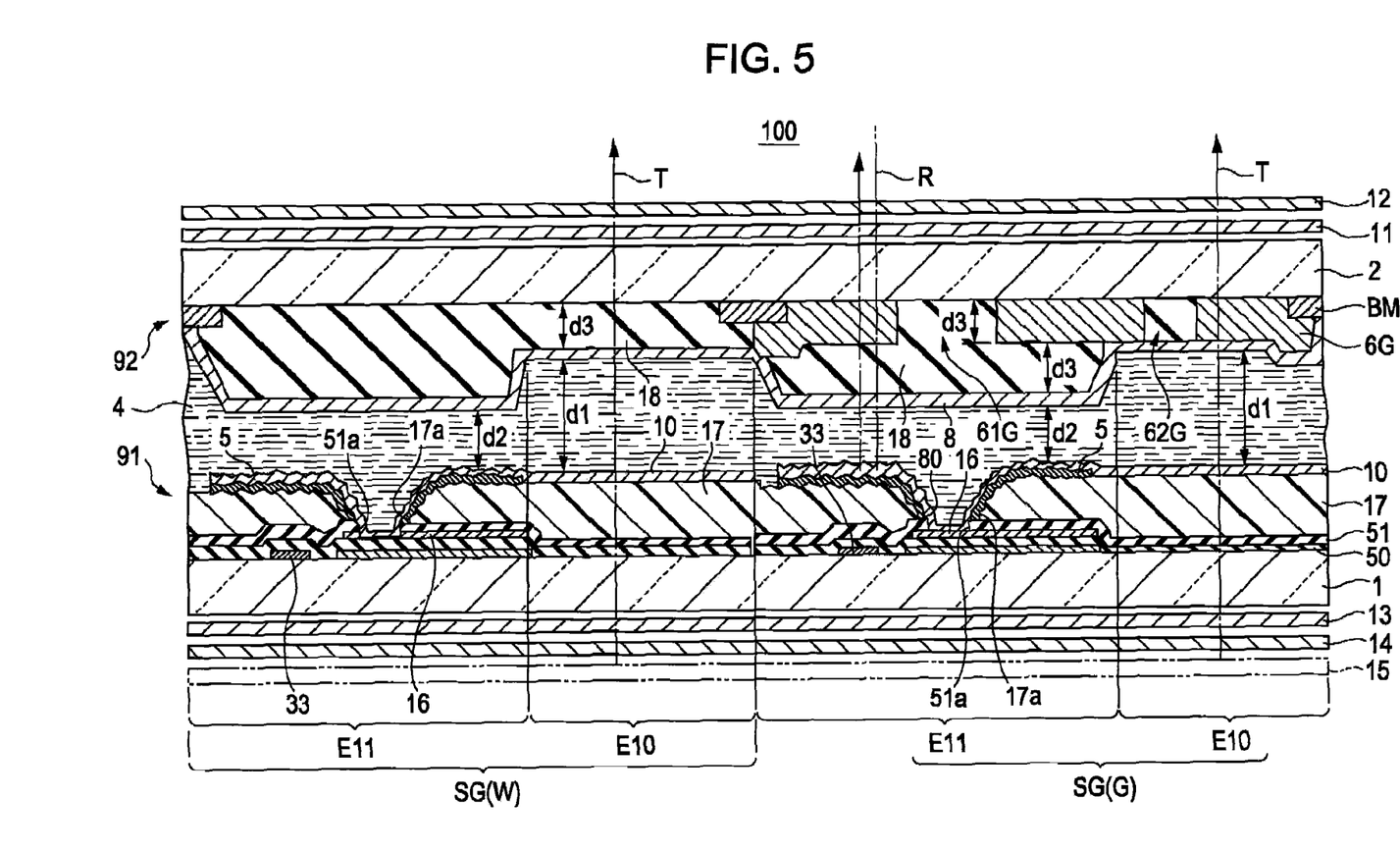
FIG. 5 is a partial sectional view taken along the line V-V of FIG. 2.

FIG. 5 is a partial sectional view taken along the line V-V of FIG. 2 and shows the sectional construction including a W sub-pixel SG. In order to easily understand the difference between the sectional construction of the W sub-pixel SG and the sectional construction of R, G, or B sub-pixel SG, the sectional construction of the G sub-pixel SG is also shown in FIG. 5. In FIG. 5, the W sub-pixel SG is abbreviated to SG(W) and the G sub-pixel SG is abbreviated to SG(G). Hereinafter, the above-mentioned elements are indicated by the same numerals or symbols and descriptions thereof will be simplified or omitted.

First, the construction of the element substrate 91 corresponding to the W sub-pixel SG will be described in comparison with the construction of the element substrate 91 corresponding to the G sub-pixel SG.

The construction of the color filter substrate 92 corresponding to the W sub-pixel SG is as follows. The insulating layer 18 for adjusting a cell thickness is formed on the upper substrate 2, and the common electrode 8 is formed on the insulating layer 18 for adjusting a cell thickness. The W sub-pixel SG does not have a colored layer using a white color material as described above.

The above-mentioned element substrate 91 corresponding to the W sub-pixel SG is disposed opposite to the color filter substrate 92 corresponding to the corresponding transmissive region E10 with the liquid crystal layer 4 interposed therebetween. The thickness of the liquid crystal layer 4 corresponding to the W sub-pixel SG is set to the same value as the thickness $d1$ ($\approx d2+d3$) of the liquid crystal layer 4 corresponding to the transmissive region E10 of each of the R, G, and B sub-pixels.

The principle upon which transmissive display is performed in the W sub-pixel SG is substantially the same as described above. In other words, when transmissive display is performed in the W sub-pixel SG, illuminating light emitted from the backlight 15 propagates along a path T shown in FIG. 5, passes through the gate insulating layer 50, the passivation layer 51, the pixel electrode 10, the common electrode 8, the insulating layer 18 for adjusting a cell thickness, etc., and reaches the observer. In this case, the illuminating light expresses a predetermined intensity by passing through the above-mentioned elements. As a result, it is possible to achieve high brightness and high contrast.

In the liquid crystal display device 100 according to the present embodiment, high intensity and high contrast are realized by using the W display pixel in addition to the R, G, and B display pixels. Since the W display pixel does not have a color material, in order to set the thickness of the liquid crystal layer (cell thickness) corresponding to the transmissive region of the R, G, or B display pixel and the thickness of the liquid crystal layer (cell thickness) corresponding to the transmissive region of the W display cell to the same value, it is necessary to provide a transparent resin layer for adjusting a cell thickness at a position corresponding to the W display pixel. Further, in the transflective liquid crystal display device 100 having the multi-gap structure, in order to make optical characteristics uniform in the transmissive region and the reflective region, a resin layer for a multi-gap structure is formed in the reflective region and the thickness of the liquid crystal layer corresponding to the transmissive region is set to be larger than the thickness of the liquid crystal layer corresponding to the reflective region.

Herein, the term 'transparent' may have a reddish tinge, a bluish tinge, or a yellowish tinge, because the resin layer can be slightly colored by the inherent color of the resin. In particular, the term 'transparent' means a color in a range of (X, Y)=(0.3 to 0.4, 0.3 to 0.4) in the CIE chromaticity diagram.

It is preferable that the relationship among the thickness $d1$ of the liquid crystal layer 4 corresponding to the transmissive region E10 of each of the R, G, B, and W sub-pixels, the thickness $d2$ of the liquid crystal layer 4 corresponding to the reflective region E11 of each of the R, G, B, and W sub-pixels, the thickness $d3$ of the insulating layer 18 for adjusting a cell thickness corresponding to the transmissive region E10 of the W sub-pixel, and the thickness $d3$ of the colored layer 6 be set to $d1 \approx d2+d3$. Further, when the thickness $d1$ is set to 4 μm and the thickness $d2$ is set to 2 μm, it is preferable to set the thickness $d3$ to about 2 μm.

Application Example of White Balance Adjustment

Next, a method of adjusting a white balance by using the uncolored portion of the above-mentioned sub-pixel SG will be described by exemplifying a display pixel having a pixel arrangement structure shown in FIG. 6. In the above description of the construction of the liquid crystal display device 100, the sub-pixel SG is divided into two regions, and only one of the two regions is provided with the reflective electrode 5 so as to be a reflective region, and the other region where the reflective electrode 5 is not formed becomes a transmissive region. In contrast, in an example to be described below, for convenience of explanation, it is assumed that the sub-pixel SG has a reflective region where a reflective electrode 5 is formed and a transmissive region composed of an opening portion formed at the center of the reflective electrode 5 as shown in FIG. 6.

Figure 6:
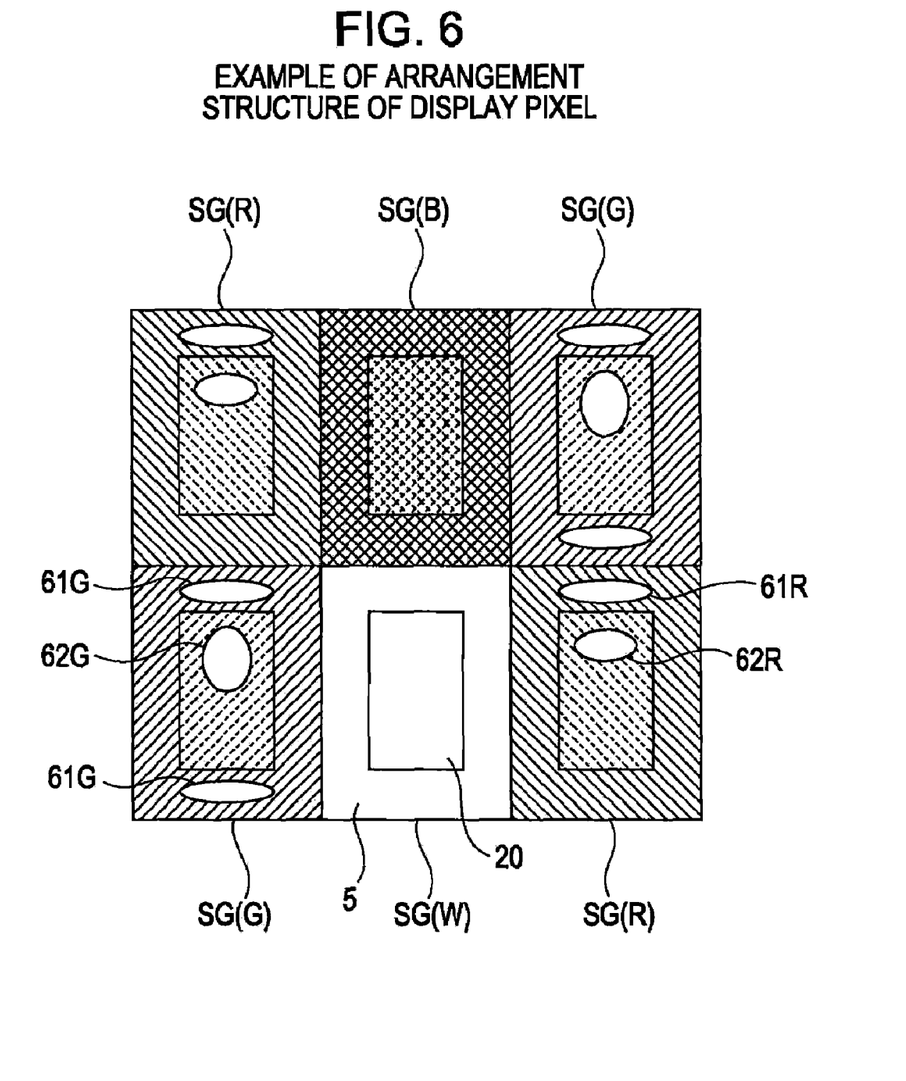
FIG. 6 is a view showing an example of a pixel arrangement structure of a display pixel.

The display pixel shown in FIG. 6 has sub-pixels SG arranged in a two by three matrix and one unit is composed of six sub-pixels, that is, two R sub-pixels, two G sub-pixels, one B sub-pixel, and one W sub-pixel. In a human eye, the number of sensory receptors sensing blue color is smaller than the number of sensory receptors sensing red color or green color. That is why the number of the B sub-pixel is fewer than the number of the R or G sub-pixels. Since the B sub-pixel does not have so much intensity information in comparison with the G or R sub-pixel and just maintains a color balance, it is possible to markedly improve intensity by replacing the B sub-pixel with the W sub-pixel. In the invention, one display pixel is composed of R, G, B, and W sub-pixels unlike the related art in which one display pixel is composed of R, G, and B sub-pixels. For this reason, in the invention, display is performed by using a rendering technique different from that in the related art.

In the display pixel shown in FIG. 6, the number of the B sub-pixel is fewer than the number of the R or G sub-pixels. Therefore, in the whole display pixel, the area of the B sub-pixel is smaller than the area of the R or G sub-pixel. In particular, in the display pixel, the total area of the B sub-pixel of the R, G, and B sub-pixels and the W sub-pixels is substantially the same as the area of the R sub-pixels or the area of the G sub-pixels. In the display pixel shown in FIG. 6, as an example, the area proportion of the R, G, B, and W sub-pixels is 2:2:1:1. When the liquid crystal display device including display pixels having the above-mentioned arrangement structure performs white display, a B light component is insufficient, and thus yellowish white display is performed.

In the sub-pixels SG of the display pixel shown in FIG. 6, uncolored portions 61R and 62R are provided in each of the R sub-pixels SG and uncolored portions 61G and 62G are provided in each of the G sub-pixels SG. The uncolored portions indicate portions where no colored layer 6 is provided. Further, the uncolored portion 61 is provided on the reflective electrode 5 and the uncolored portion 62 is provided on an opening portion 20.

As described above, the amount of the G light component in the reflective display can be adjusted by adjusting the area of the uncolored portions 61G. Further, the amount of the G light component in the transmissive display can be adjusted by adjusting the area of the uncolored portions 62G. Furthermore, as for the R sub-pixels SG, the amount of the R light component in the reflective display can be adjusted by adjusting the area of the uncolored portions 61R. In addition, the amount of the R light component in the transmissive display can be adjusted by adjusting the area of the uncolored portions 62R.

As described above, when the display pixel shown in FIG. 6 performs white display, the B light component is insufficient and thus yellowish white display is achieved. The amount of the R or G light component can be reduced as much as the reduced amount of the B light component by providing an uncolored portion in the R or G sub-pixel. As described above, in a case of the display pixel shown in FIG. 6, when an uncolored portion is provided in the R or G sub-pixel, the white balance in the white display can be adjusted to be a predetermined color temperature state and coloring in the white display can be restricted.

Figure 7:
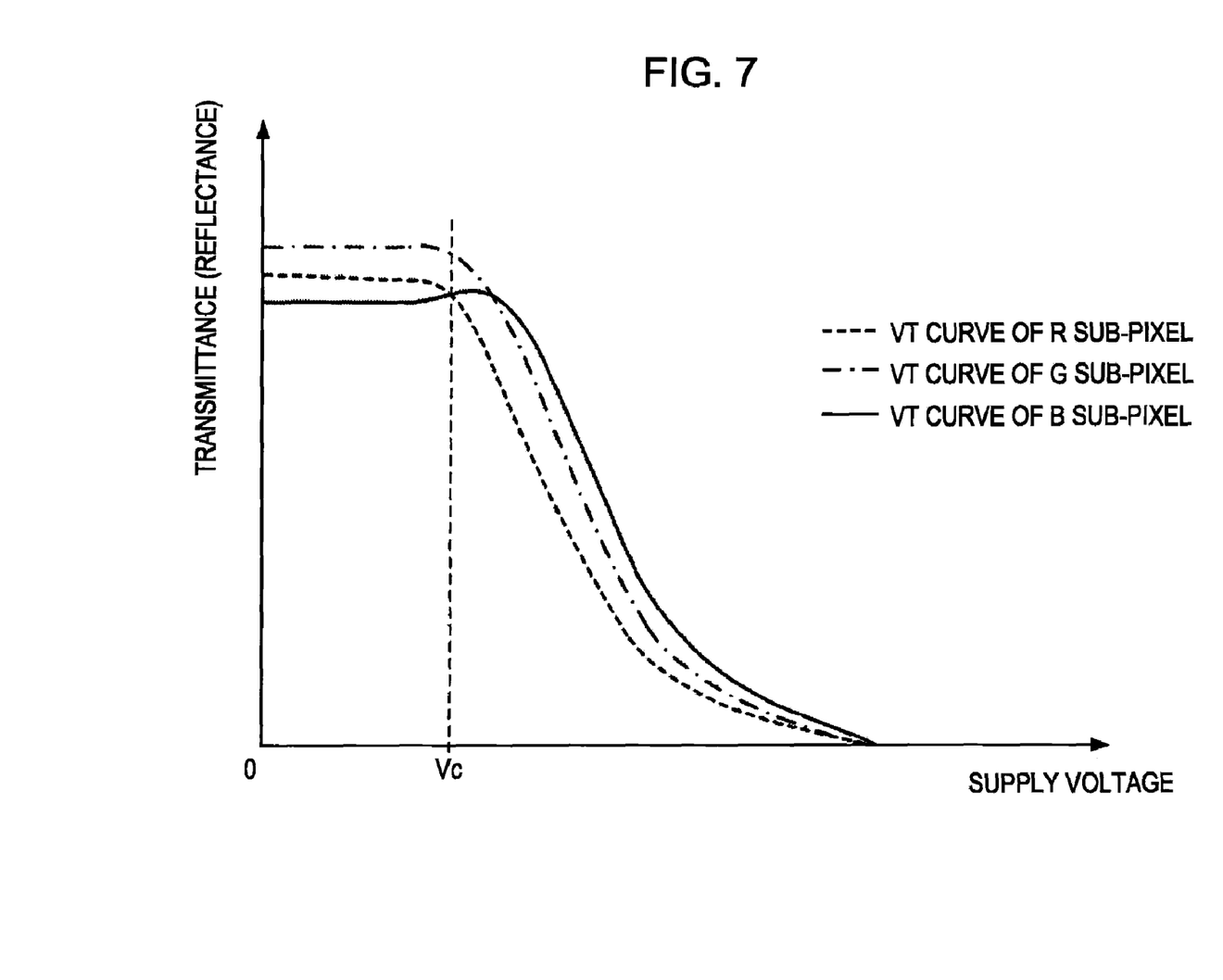
FIG. 7 is a graph illustrating the relationship between a supply voltage and transmittance in a known liquid crystal display device.

Next, the areas of the uncolored portions 61 and 62 provided in the R or G sub-pixels SG will be described. FIG. 7 is a graph showing the relationship between a supply voltage and transmittance in each of the R, G, and B sub-pixels of a known liquid crystal display device. The known liquid crystal display device is a normally white liquid crystal display device including R, G, and B sub-pixels. In the known liquid crystal display device, cell thicknesses in the R, G, and B sub-pixels are the same. In FIG. 7, the horizontal axis indicates a supply voltage applied between the pixel electrode of the sub-pixel and the common electrode and the vertical axis indicates the optical transmittance of the R, G, and B sub-pixels. The optical transmittance of each of the R, G, and B sub-pixels is determined by the liquid crystal alignment state of the liquid crystal layer 4.

In FIG. 7, as the supply voltage increases, the optical transmittance of each of the R, G, and B sub pixels does not vary until a predetermined voltage Vc. In a case in which the supply voltage is higher than the voltage Vc, that is, in a case of intermediate grayscale display, the liquid crystal alignment state of the liquid crystal layer 4 varies, and accordingly, the optical transmittance of each of the R, G, and B sub-pixels varies. As shown in FIG. 7, when the supply voltage exceeds the voltage Vc, the curves (hereinafter, referred to as 'VT curves') showing the optical transmittance in each sub-pixel sharply descend. In other words, the optical transmittance in each of the R, G, and B sub-pixels decreases. The properties in which the VT curves of the sub-pixels of the individual colors descend are different according to the sub-pixels of the individual colors. The transmittance of the R sub-pixel decreases with the sharpest curve and the transmittance of the B sub-pixel decreases with the shallowest curve. Therefore, when the supply voltage is higher than the voltage Vc, the transmittance of the B sub-pixel is higher than that of the G sub-pixel, and the transmittance of the G sub-pixel is higher than that of the R sub-pixel. As understood from the properties of the graph of FIG. 7, even in any case including intermediate grayscale display, the transmittance of the G sub-pixel is always higher than the transmittance of the R sub-pixel.

In FIG. 7, even assuming that the vertical axis indicates the optical reflectance of the sub-pixel, since the value of the optical reflectance of the sub-pixel is determined by the liquid crystal alignment state of the liquid crystal layer 4, the same properties as in the case in which the vertical axis indicates the optical transmittance of the sub-pixel are achieved. Therefore, even in any case including intermediate grayscale display, the reflectance of the G sub-pixel is always higher than the reflectance of the R sub-pixel.

From the preceding descriptions, it can be understood that the G light component is always brighter than the R light component in both transmissive display and reflective display. Therefore, in a case of adjusting the white balance, it is preferable that the decrease in the amount of the G light component is larger than the decrease in the amount of the R light component. For this reason, the areas of the uncolored portions 61G and 62G provided in the G sub-pixel SG become larger than the areas of the uncolored portions 61R and 62R provided in the R sub-pixel, respectively. As a result, it is possible to more properly adjust the white balance in any case including intermediate grayscale display.

Figure 8:
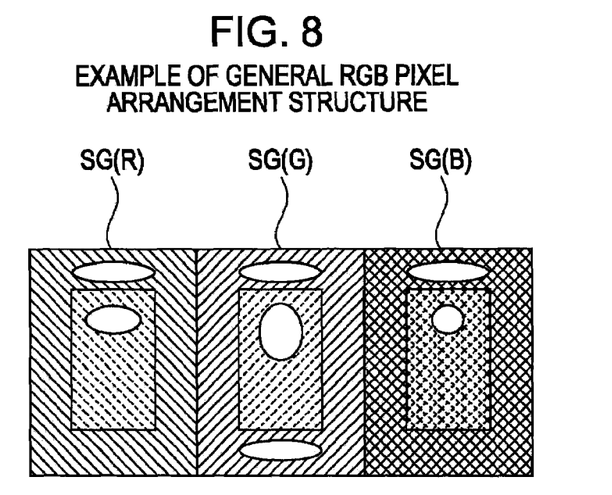
FIG. 8 is a view showing an example of a known pixel arrangement structure.

Next, a specific range of a proportion of each uncolored portion corresponding to the R or G sub-pixel SG will be described. FIG. 8 shows an example of providing an uncolored portion in a known RGB pixel arrangement structure, that is, a display pixel composed of one R sub-pixel, one G sub-pixel, and one B sub-pixel. In a case of the known RGB pixel arrangement structure shown in FIG. 8, in order to perform proper white display, the proportion of the total area of the uncolored portions to the area of each of the sub-pixel is preferably 18% in the R sub-pixel, 44% in the G sub-pixel, and 13% in the B sub-pixel. In the display pixel shown in FIG. 6, when the two R sub-pixels are regarded as one sub-pixel, two G sub-pixels are regarded as one sub-pixel, and the W and B sub-pixels are regarded as one B sub-pixel, the display pixel is regarded to be composed of one R sub-pixel, one G sub-pixel, and one B sub-pixel similar to the known RGB pixel arrangement structure. Further, the B sub-pixel can be regarded to have an uncolored portion occupying 50% of the area of the B sub-pixel. Therefore, while considering the proportion of the area of the uncolored portions corresponding to the area of the sub-pixel for performing proper white display in the above-mentioned known RGB pixel arrangement, the higher upper limit of the proportion of the uncolored portions 61 and 62 of the R or G sub-pixel required to perform proper white display in the display pixel shown in FIG. 6 is preferable.

Figure 9:
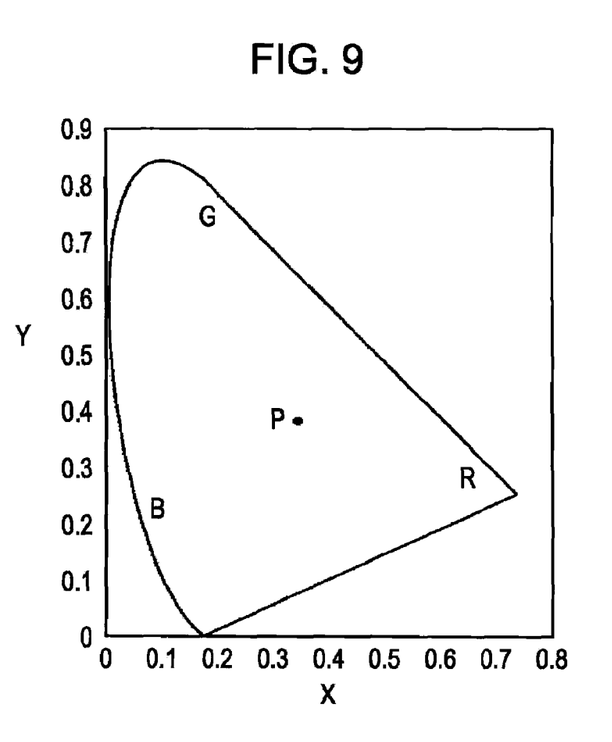
FIG. 9 is a chromaticity diagram showing coordinates of the chromaticity of white display.

The lower limit of the area proportion of the uncolored portions of the R sub-pixel SG required for performing proper white display is appropriately 10% of the total area of the R sub-pixel SG, and the lower limit of the area proportion of the uncolored portions of the G sub-pixel SG required for performing proper white display is appropriately 30% of the total area of the G sub-pixel SG. In a case of performing reflective display, for example, when the area of the reflective electrode 5 is 35% of the sub-pixel, the proportion of the uncolored portions of the R sub-pixel SG becomes 3.5% (=35%×10%), and the proportion of the uncolored portions of the G sub-pixel SG becomes 9.5% (=35%×30%). In this case, the chromaticity of the white display represents the coordinates P in the CIE (International Commission on Illumination) chromaticity diagram shown in FIG. 9. When the X coordinates in the chromaticity diagram corresponding to R, G, B, and W are X(R), X(G), X(B), and X(W), respectively, and the Y coordinates corresponding to R, G, B, and W are Y(R), Y(G), Y(B), and Y(W), respectively, since white display is realized in a case of turning on all sub-pixels of each display pixel, the coordinates P can be represented by $(X, Y)=(X(R)+X(G)+X(B)+X(W), Y(R)+Y(G)+Y(B)+Y(W))$. For example, when an uncolored portion is provided in the R sub-pixel SG and the portion of the R colored layer is reduced by half, the X coordinate of the coordinates P can be represented by X(R)/2+X(G)+X(B)+X(W). In this case, the coordinates P (X,Y) of the display pixel shown in FIG. 6 become about (0.34, 0.39). Since a range of each of the coordinates X and Y in which display equivalent to white display is achieved is 0.3 to 0.4, respectively, in the display pixel shown in FIG. 6, white display equivalent to white display can be achieved.

As described above, in the pixel arrangement structure of the display pixel shown in FIG. 6 composed of two R sub-pixels, two G sub-pixels, one B sub-pixel, and one W sub-pixel, the uncolored portions 61 and 62 are provided in the opening portion 20, that is, the transmissive region and the reflective electrode 5, that is, the reflective region in each of the R and G sub-pixels SG. Therefore, in both transmissive display and reflective display, the white balance in the white display can be set to a predetermined color temperature state and the coloring in the white display can be restricted.

Modification

Figure 10:
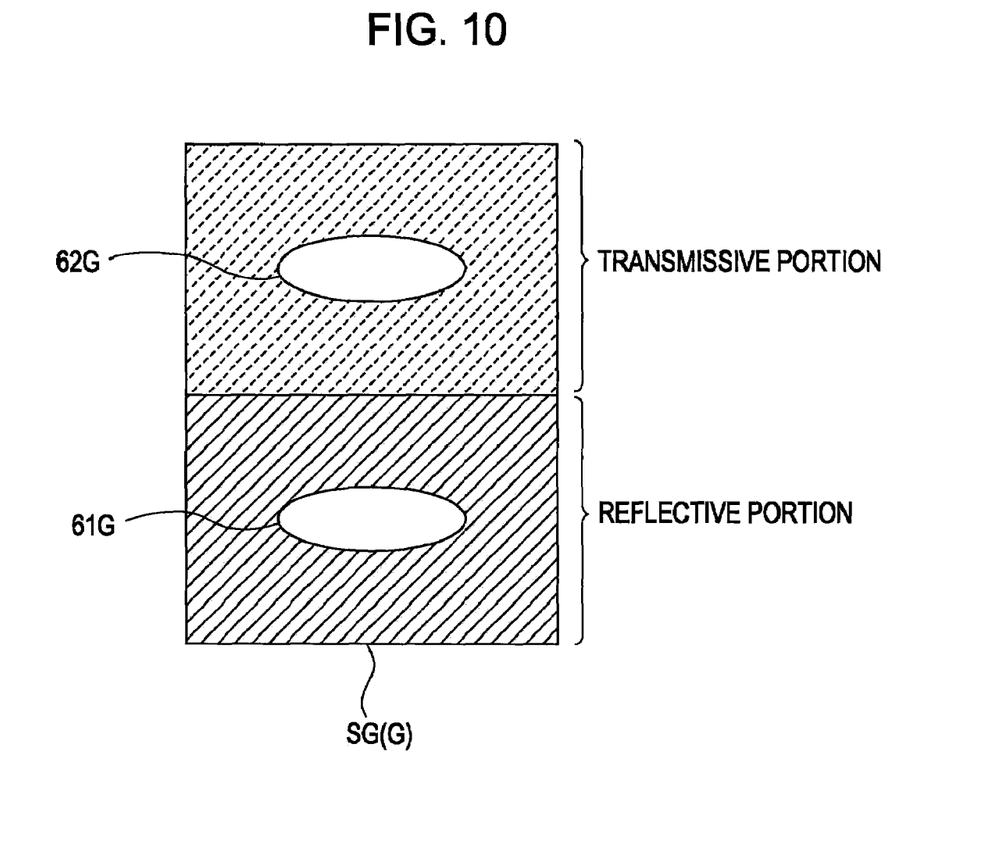
FIG. 10 is a view showing a modified example of the construction of the sub-pixel.

In the above-mentioned embodiment, the reflective electrode 5 is formed in every sub-pixel SG, the region where the reflective electrode 5 is formed has referred to as a reflective region, and the opening portion 20 where the reflective electrode 5 is not formed has referred to as a transmissive region. However, the invention can be applied to other aspects. For example, as shown in FIG. 10, a reflective electrode 5 having an opening portion may be formed. However, as described in the above-mentioned liquid crystal display device 100, it is possible that a sub-pixel is divided to two regions such that a reflective electrode 5 is formed in only one of the two regions, and a reflective electrode 5 is not formed in the other region. In this case, the region where the reflective electrode 5 is formed becomes a reflective region and the region where the reflective electrode 5 is not formed becomes a transmissive region. Even in this case, the proportions of R and G light components can be reduced by providing uncolored portions 61 and 62 in the two regions of each of the R and G sub-pixels and it is possible to set the white balance in white display to a predetermined color temperature state.

In the above-mentioned example of the pixel arrangement structure of the display pixel shown in FIG. 6, a case in which the area of the B sub-pixel is smaller than the areas of the sub-pixels of the other colors has been described. However, the method according to the invention can be used even in a case in which the area of the sub-pixel of another color is smaller than the areas of the sub-pixels of the other colors. In this case, it is possible to set the white balance in white display to a predetermined color temperature state by providing uncolored portions in the sub-pixels of colors other than the color of the sub-pixel having the corresponding small area.

Electronic Apparatus

Figure 11A:
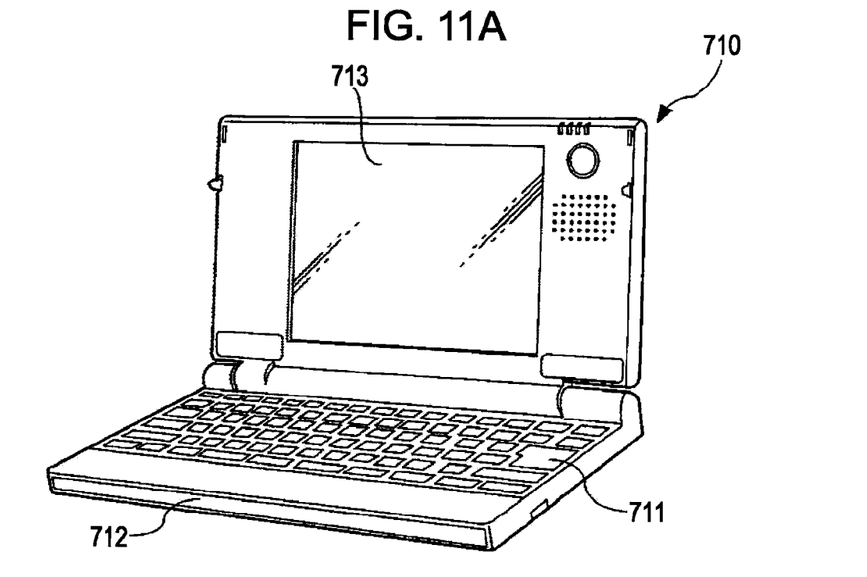
FIG. 11A is a view showing an example of an electronic apparatus to which the liquid crystal display device according to the embodiment is applied.
Figure 11B:
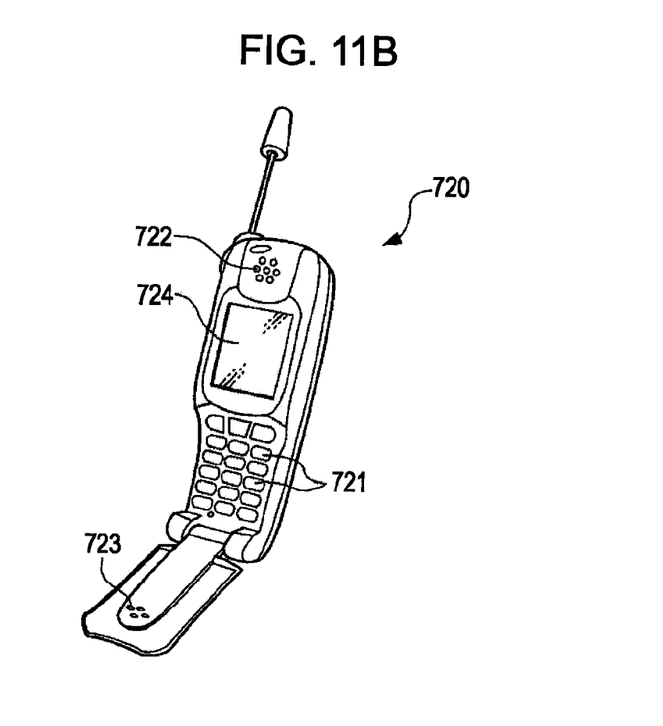
FIG. 11B is a view showing another example of an electronic apparatus to which the liquid crystal display device according to the embodiment is applied.

Next, specific examples of an electronic apparatus to which the liquid crystal display device 100 according to the invention can be applied will be described with reference to FIGS. 11A and 11B.

First, an example in which the liquid crystal display device 100 is applied to a display unit of a portable personal computer (notebook computer) will be described. FIG. 11A is a perspective view showing the construction of the personal computer. As shown in FIG. 11A, the personal computer 710 includes a main body 712 having a keyboard 711 and a display unit 713 to which the liquid crystal display device 100 according to the invention is applied.

Subsequently, an example in which the liquid crystal display device 100 according to the invention is applied to a display unit of a mobile telephone will be described. FIG. 11B is a perspective view showing the construction of the mobile telephone. As shown in FIG. 11B, the mobile telephone 720 includes a plurality of operation buttons 721, a mouthpiece 722, an earpiece 723, and a display unit 724 to which the liquid crystal display device 100 according to the invention is applied.

Electronic apparatuses to which the liquid crystal display device 100 can be applied according to this embodiment may be a liquid crystal television set, viewfinder type and monitor-direct-view type video recorders, a car navigator, a pager, an electronic organizer, an electronic calculator, a word processor, a workstation, a video phone, a POS terminal, a digital still camera, etc.

The entire disclosure of Japanese Patent Application Nos: 2005-198384, filed Jul. 7, 2005 and 2006-090366, filed Mar. 29, 2006 are expressly incorporated by reference herein.

What is claimed is:

1. An electro-optical device comprising:
a plurality of display pixels each of which has two Red sub-pixels, two Green sub-pixels, one Blue sub-pixel, and one transparent sub-pixel;
colored layers including a Red colored layer, a Green colored layer, and a Blue colored layer which are formed on the Red, Green, and Blue sub-pixels respectively; and
at least one uncolored portion formed in parts of each of the Red and Green sub-pixels where the colored layers are not formed, wherein each of the Blue sub-pixels is entirely and substantially uniformly colored,
wherein the Red colored layer and the Green colored layer enclose the at least one uncolored portion formed on the Red and Green sub-pixels respectively and the at least one uncolored portion allows light to pass through,
wherein the area of the at least one uncolored portion is determined such that white balance in white display is adjusted to a predetermined color temperature.

2. The electro-optical device according to claim 1, wherein in each of the plurality of display pixels, the total area of the Blue sub-pixel and the transparent sub-pixel is substantially equal to the area of the two Red sub-pixels and is substantially equal to the area of the two Green sub-pixels.

3. The electro-optical device according to claim 1, wherein each of the Red, Green, and Blue sub-pixels has a transmissive region and a reflective region, and a first uncolored portion of the at least one uncolored portion is formed in the transmissive region of each of the Red and Green sub-pixels.

4. The electro-optical device according to claim 1, wherein each of the Red, Green, and Blue sub-pixels has a transmissive region and a reflective region, and a second uncolored portion of the at least one uncolored portion is formed in the reflective region of each of the Red and Green sub-pixels.

5. The electro-optical device according to claim 4, wherein the at least one uncolored portion includes a plurality of uncolored portions and a first uncolored portion of the plurality of uncolored portions is formed in the transmissive region of each of the Red and Green sub-pixels.

6. The electro-optical device according to claim 3, wherein the area of the first uncolored portion of each of the Green sub-pixels is larger than the area of the first uncolored portion of each of the Red sub-pixels.

7. The electro-optical device according to claim 4, wherein the area of the second uncolored portion of each of the Green sub-pixels is larger than the area of the second uncolored portion of each of the Red sub-pixels.

8. The electro-optical device according to claim 1, wherein the chromaticity of white displayed by using the Red, Green, Blue, and transparent sub-pixels is in a coordinate range expressed by (X, Y)=(0.3 to 0.4, 0.3 to 0.4) in a CIE (International Commission on Illumination) chromaticity diagram.

9. The electro-optical device according to claim 1, wherein the at least one uncolored portion of each of the Red sub-pixels has an area larger than 10% of the area of the Red sub-pixel.

10. The electro-optical device according to claim 1, wherein the at least one uncolored portion of each of the Green sub pixels has an area larger than 30% of the area of the Green sub-pixel.

11. The electro-optical device according to claim 1, wherein each of the Red, Green, and Blue sub-pixels of one of the plurality of display pixels performs display by superimposing a gray-scale signal which is applied for display of the sub-pixels in one display pixel to sub-pixels having the same color with the one display pixel around the one display pixel.

12. An electro-optical device comprising:
a plurality of display pixels each of which has at least one transparent sub-pixel, one Red sub-pixel, one Green sub-pixel, and one Blue sub-pixel; and
a Red colored layer, a Green colored layer, and a Blue colored layer which are formed on the Red, Green, and Blue sub-pixels respectively,
wherein an uncolored portion is provided in a part of each of the Red and Green sub-pixels where the colored layer is not formed, wherein each of the Blue sub-pixels is entirely and substantially uniformly colored,
wherein the Red colored layer and the Green colored layer enclose the at least one uncolored portion formed on the Red and Green sub-pixels respectively and the at least one uncolored portion allows light to pass through,
wherein the area of the at least one uncolored portion is determined such that white balance in white display is adjusted to a predetermined color temperature.

13. An electronic apparatus comprising the electro-optical device according to claim 1 as a display unit.

14. The electro-optical device according to claim 1, wherein each of the Red, Green, and Blue sub-pixels has a transmissive region, and the at least one uncolored portion is formed in the transmissive region of each of the Red and Green sub-pixels.

15. The electro-optical device according to claim 1, wherein the area of the at least one uncolored portion is determined such that red, green, and blue colored light displayed by the colored layers are balanced in a white display.

* * * * *